US 12,320,978 B2

(12) United States Patent
Lam et al.

(10) Patent No.: US 12,320,978 B2
(45) Date of Patent: *Jun. 3, 2025

(54) MULTILAYER WAVEPLATE OPTICAL STRUCTURES

(71) Applicant: Meta Platforms Technologies, LLC, Menlo Park, CA (US)

(72) Inventors: Wai Sze Tiffany Lam, Redmond, WA (US); Yijing Fu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 944 days.

This patent is subject to a terminal disclaimer.

(21) Appl. No.: 17/378,223

(22) Filed: Jul. 16, 2021

(65) Prior Publication Data

US 2021/0341743 A1 Nov. 4, 2021

Related U.S. Application Data

(63) Continuation of application No. 15/926,918, filed on Mar. 20, 2018, now Pat. No. 11,092,808.

(51) Int. Cl.
*G02B 27/01* (2006.01)
*F21V 8/00* (2006.01)
*G02B 5/30* (2006.01)

(52) U.S. Cl.
CPC ....... *G02B 27/0172* (2013.01); *G02B 5/3083* (2013.01); *G02B 6/0016* (2013.01); *G02B 6/0028* (2013.01); *G02B 6/0036* (2013.01); *G02B 6/0076* (2013.01); *G02B 2027/0178* (2013.01)

(58) Field of Classification Search
CPC . G02B 5/3083; G02B 27/0172; G02B 6/0016
USPC .......................... 359/485.01, 487.04, 489.07
See application file for complete search history.

(56) References Cited

U.S. PATENT DOCUMENTS

| | | | | |
|---|---|---|---|---|
| 7,573,640 | B2* | 8/2009 | Nivon | G02B 27/102 |
| | | | | 359/630 |
| 11,092,808 | B1* | 8/2021 | Lam | G02B 27/0018 |
| 11,156,832 | B1* | 10/2021 | Keith | G02B 6/0033 |
| 11,841,512 | B2* | 12/2023 | Kim | G02B 27/0176 |
| 11,885,967 | B2* | 1/2024 | Lam | G02B 6/34 |
| 2006/0146682 | A1* | 7/2006 | Sharp | G11B 7/1275 |
| 2006/0221448 | A1 | 10/2006 | Nivon et al. | |
| 2014/0140654 | A1 | 5/2014 | Brown et al. | |
| 2017/0212348 | A1* | 7/2017 | Fu | G02B 6/02052 |
| 2018/0082644 | A1* | 3/2018 | Bohn | G02B 6/003 |
| 2018/0120559 | A1 | 5/2018 | Yeoh et al. | |
| 2018/0284440 | A1* | 10/2018 | Popovich | G02B 27/0093 |

(Continued)

OTHER PUBLICATIONS

Sharp, G.D. Retarder Stack Technology for Color Manipulation, Society for Information Display, 1999, Boulder, Colorado.

*Primary Examiner* — Ricky D Shafer
(74) *Attorney, Agent, or Firm* — Greenberg Traurig, LLP

(57) ABSTRACT

An optical structure includes an input grating and a multilayer waveplate. The input grating is configured to incouple a first spectrum of received image light. The multilayer waveplate is configured to reflect the first spectrum of the image light incoupled by the input grating in the second polarization orientation and reflect a second spectrum of the image light incoupled by the input grating by diffraction in the first polarization orientation.

13 Claims, 6 Drawing Sheets

(56) References Cited

U.S. PATENT DOCUMENTS

2019/0086674 A1* 3/2019 Sinay ................. G02B 27/0172
2019/0121027 A1* 4/2019 Popovich ............. G02B 27/283

* cited by examiner

MULTILAYER WAVEPLATE OPTICAL STRUCTURES

CROSS-REFERENCE TO RELATED APPLICATIONS

This application claims priority to U.S. non-provisional application Ser. No. 15/926,918 filed Mar. 20, 2018, which is hereby incorporated by reference.

TECHNICAL FIELD

This disclosure relates generally to optics, and in particular to optical structures for directing image light

BACKGROUND INFORMATION

Head Mounted Displays (HMDs) are commercially available to facilitate augmented reality (AR) and/or Virtual Reality (VR) experiences for wearers of the HMDs. In AR and VR experiences, the HMD delivers images to an eye or eyes of the wearer. Delivering high quality images to users of the HMD is desirable, although space and/or weight constraints inherent to HMDs may present design challenges for delivering high quality images to the user. Other design contexts also place a high value on delivering high quality images within certain design constraints.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of waveguides that include a multilayer waveplate are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The optical structures that are described in this disclosure include waveguides for directing image light to an eye of a wearer of a Head Mounted Display (HMD), among other contexts that the disclosed optical structures could be used in. An HMD may include a display for directing image light to a wearer of an HMD. Viewing optics may also be included in an HMD to route and focus the image light for the eye of the wearer/user. In some implementations, a waveguide is used to direct the image light to the eye. However, prior implementations of waveguides have generated undesirable ghost images, in certain contexts. The ghost images may become more prevalent when the waveguide is not perfectly flat (e.g. wedge shaped). In one particular context, visible light from at least a portion of one spectrum (e.g. green light) bleeds into a waveguide that is designed to direct a different spectrum (e.g. blue light) to the eye, which generates green ghost images.

In embodiments of this disclosure, one or more waveguides include a multilayer waveplate so that light from an unwanted spectrum that bleeds into a particular waveguide may be outcoupled from the waveguide to reduce ghost images that are presented to the eye. These and other embodiments are described in detail below.

Figure 1:
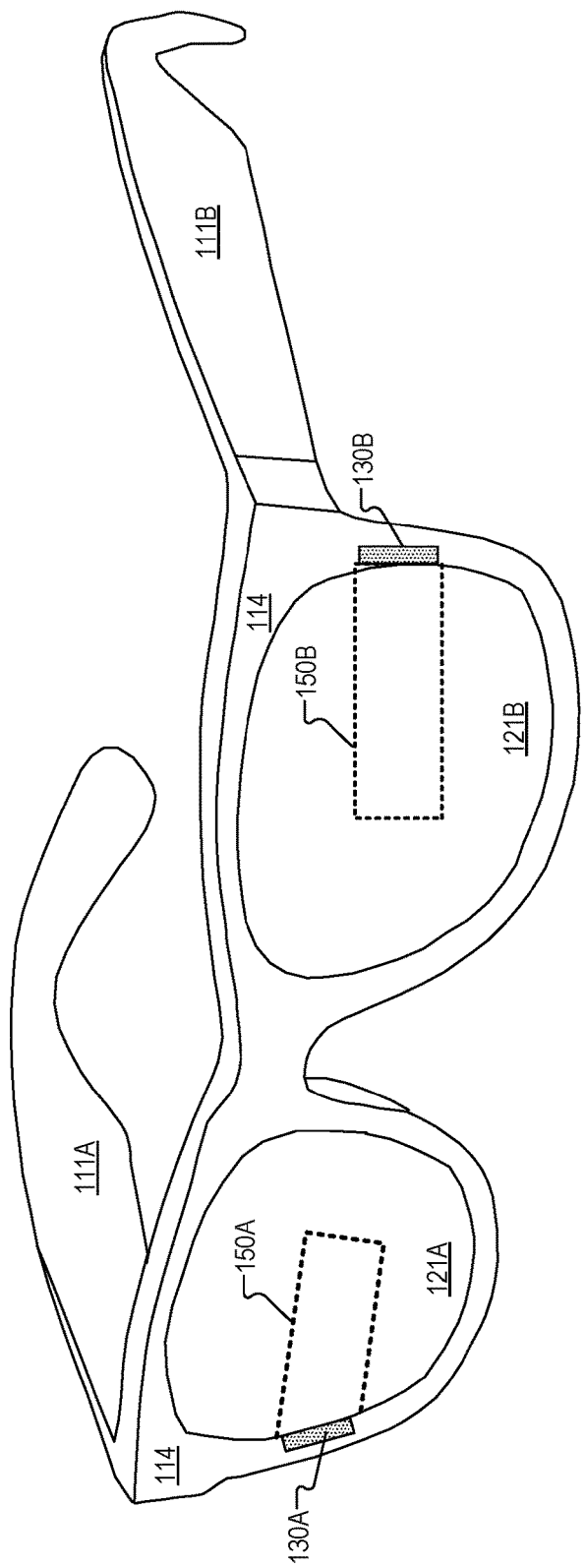
FIG. 1 illustrates an example Head Mounted Display that includes at least one waveguide for directing image light to an eyebox area, in accordance with an embodiment of the disclosure.

FIG. 1 illustrates an example Head Mounted Display (HMD) 100 that includes at least one waveguide for directing image light to an eyebox area, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

In FIG. 1, each lens 121 includes a waveguide 150 to direct image light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing image light to a wearer of HMD 100.

The frame 114 and arms 111 of the HMD may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving image light directed to her eye(s) by waveguide(s) 150. In some embodiments, image light is only directed into one eye of the wearer of HMD 100. In an embodiment, both displays 130A and 130B are included to direct image light into waveguides 150A and 150B, respectively.

Figure 2:
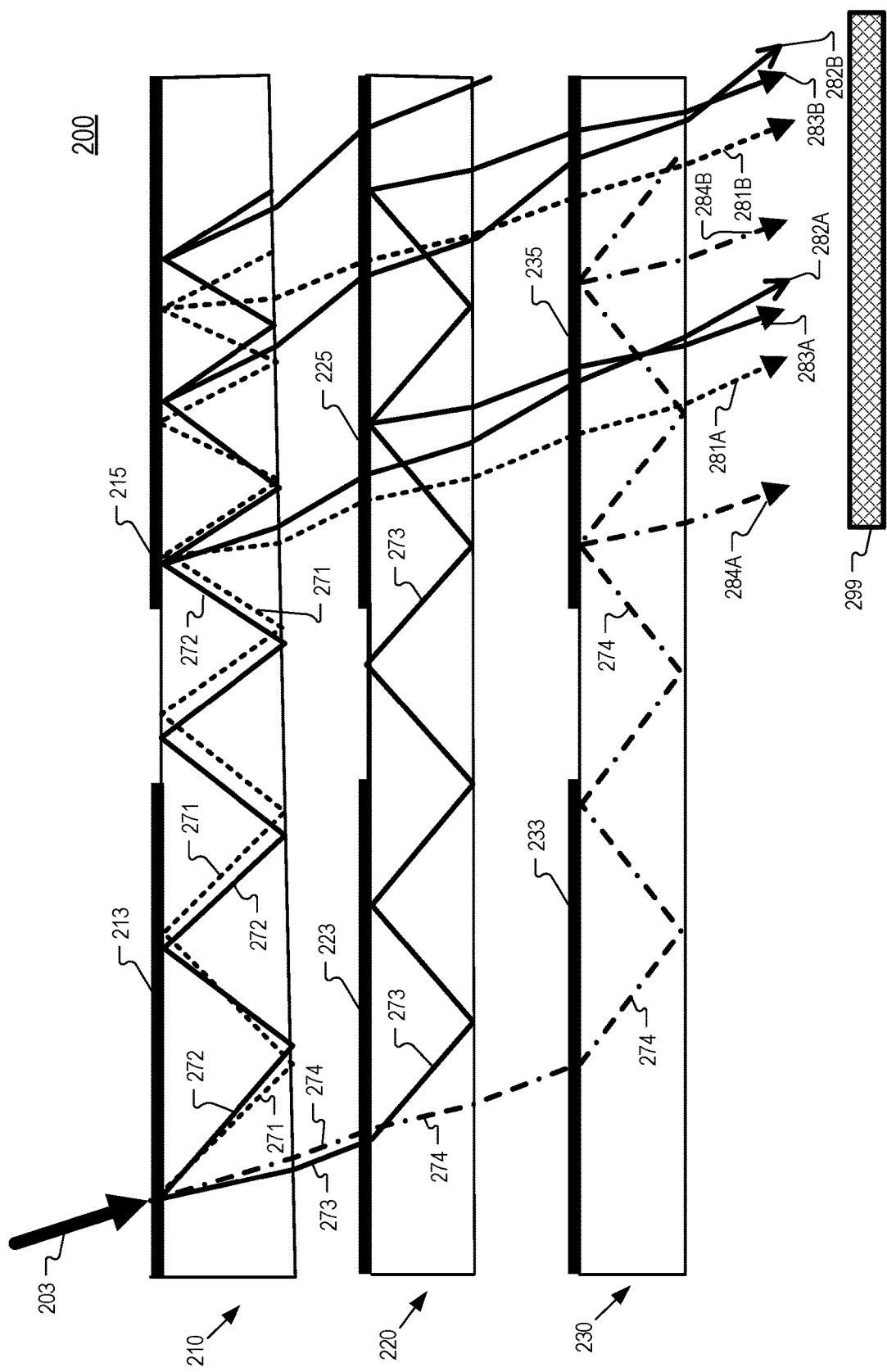
FIG. 2 illustrates a red, green, and blue stacked waveguide.

FIG. 2 illustrates a red, green, and blue (RGB) stacked waveguide 200 that could be used as waveguide(s) 150. FIG. 2 shows that RGB stacked waveguide 200 includes a blue waveguide 210, a green waveguide 220, and a red waveguide 230. RGB stacked waveguide 200 receives image light 203. Image light 203 may be generated by a display 130, for example. Blue waveguide 210 is configured to incouple the blue image light from image light 203 and direct the blue image light in an eyebox direction to an eyebox area 299. Green waveguide 220 is configured to incouple the green image light from image light 203 and direct the green image light in an eyebox direction to an eyebox area 299. Similarly, red waveguide 230 is configured to incouple the red image light from image light 203 and direct the red image light in an eyebox direction to an eyebox area 299.

Blue waveguide 210 includes an input grating 213 configured to incouple the blue image light and an output grating 215 is configured to direct the blue image light propagating in waveguide 210 to the eyebox area 299. Waveguide 210 may rely on the Total Internal Reflection (TIR) to confine the blue image light to the blue waveguide 210 until output grating 215 directs the blue image light to the eyebox area 299.

Green waveguide 220 includes an input grating 223 configured to incouple the green image light and an output grating 225 is configured to direct the green image light propagating in waveguide 220 to the eyebox area 299. Waveguide 220 may rely on the Total Internal Reflection (TIR) to confine the green image light to the green waveguide 220 until output grating 225 directs the green image light to the eyebox area 299.

Red waveguide 230 includes an input grating 233 configured to incouple the red image light and an output grating 235 is configured to direct the red image light propagating in waveguide 230 to the eyebox area 299. Waveguide 230 may rely on the Total Internal Reflection (TIR) to confine the red image light to the red waveguide 230 until output grating 235 directs the red image light to the eyebox area 299.

In FIG. 2, the blue image light is illustrated by a dashed line, the green image light is illustrated by a solid line, and the red image light is illustrated by a dash-dash-dot line. As image light 203 encounters input grating 213 of blue waveguide 210, blue image light is directed into waveguide 210 along an example optical path 271. Green image light passes through waveguide 210 along optical path 273 and is incoupled to waveguide 220 by input grating 223. Red image light passes through waveguide 210 along optical path 274 and also passes through waveguide 220 until it encounters input grating 233 which incouples the red image light into waveguide 230.

Notably, FIG. 2 also illustrates that some amount of green image light bleeds into waveguide 210 along example optical path 272. The green image light propagates through waveguide 210 until encountering output grating 215 which outcouples portions of the green image light along optical paths 282A and 282B. However, this green image light outcoupled by the blue output grating 215 contributes to green ghost images that are directed in the eyebox area 299. While only the green image light optical paths that bleed into the blue waveguide 210 are illustrated in FIG. 2, similar optical crosstalk issues may exist in the green waveguide 220 and red waveguide 230 that cause ghost images from unwanted image light bleeding into the waveguides.

Figure 3:
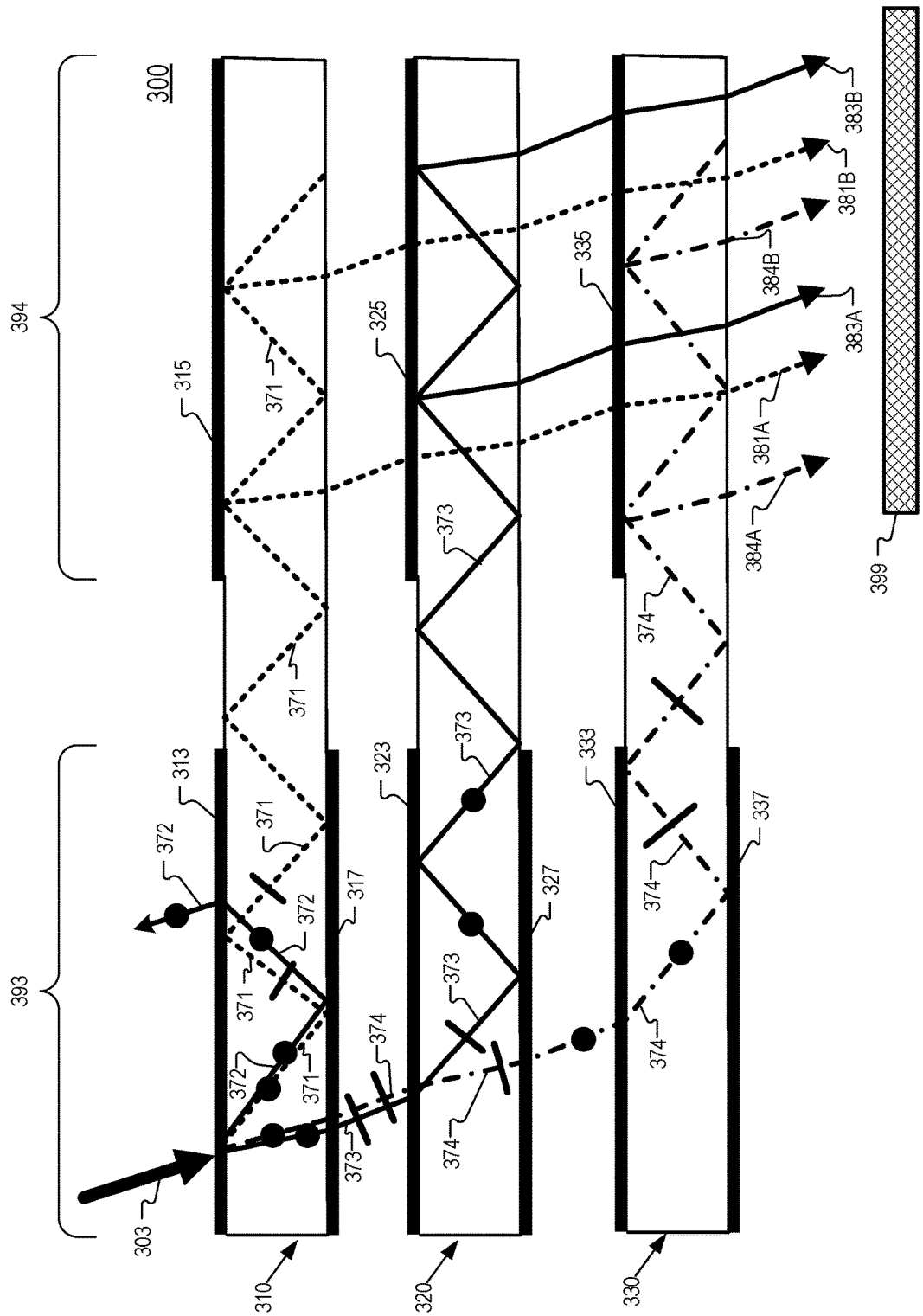
FIG. 3 illustrates example waveguides that include a multilayer waveplate, in accordance with an embodiment of the disclosure.

FIG. 3 illustrates example waveguides that include a multilayer waveplate, in accordance with an embodiment of the disclosure. The illustrated waveguides 310, 320, and 330, may be included in a stacked waveguide 300, as illustrated. Stacked waveguide 300 includes an input portion 393 and an output portion 394. The waveguides illustrated in FIG. 3 include a multilayer waveplate that acts to reduce optical crosstalk by outcoupling unwanted image light from the waveguides before the unwanted image light is directed to the eyebox area 399 by a given output grating (e.g. 315, 325, or 335). Reducing the optical crosstalk may decrease ghost images that are presented.

FIG. 3 includes a first waveguide 310, a second waveguide 320, and a third waveguide 330. First waveguide 310 is configured to incouple a first spectrum of image light 303 into the waveguide 310 and direct the first spectrum into the eyebox area 399. In one embodiment, the first spectrum of image light is blue light. The blue light may be within a range of between 450 and 480 nm, in some embodiments. Second waveguide 320 is configured to incouple a second spectrum of image light 303 into the waveguide 320 and direct the second spectrum into the eyebox area 399. In one embodiment, the second spectrum of image light is green light. The green image light may be within a range of between 500 and 550 nm, in some embodiments. Third waveguide 330 is configured to incouple a third spectrum of image light 303 into the waveguide 330 and direct the third spectrum into the eyebox area 399. In one embodiment, the third spectrum of image light is red light. The red image light may be within a range of between 620 and 650 nm, in some embodiments. Although the waveguides 310, 320, and 330 may be described with respect to red, green, and blue image light, it is understood by those skilled in the art that the disclosed structures and techniques could be applied to other spectrums of image light.

First waveguide 310 includes an input grating 313 configured to incouple a first spectrum (e.g. blue image light) of image light 303 and an output grating 315 configured to direct the first spectrum propagating in waveguide 310 to the eyebox area 399. Waveguide 310 may rely on Total Internal Reflection (TIR) to confine the first spectrum of the image light to the waveguide 310 until output grating 315 directs the first spectrum of the image light to the eyebox area 399. Input grating 313 and output grating 315 may be diffractive gratings that are tuned for a specific wavelength of image light. In the illustrated embodiment of FIG. 3, input grating 313 is configured to incouple blue image light by diffraction (e.g. first order of diffraction) along optical path 371 while passing green image light (along optical path 373) and red image light (along optical path 374). Input grating 313 may be designed toward diffracting 100% of blue image light in the first order and passing 100% of both green and red light undiffracted (zeroth order of diffraction). Although input grating 313 may be designed toward passing 100% of green image light some green image light may be diffracted (e.g. at the first order of diffraction) along optical path 372, as illustrated, due to the broad range of acceptance angle and/or broad range of wavelength. Since this unwanted green image light has bled into the blue waveguide 310, it is desirable to outcouple the green image light propagating along optical path 372 before it propagates to the output grating 315 and potentially generates green ghost images.

Input grating 313 also possesses polarization characteristics in that it is configured to transmit a first polarization orientation (e.g. s-polarization) of image light 303 and reflect a second polarization orientation (e.g. p-polarization) of image light 303 where the first polarization orientation is orthogonal to the second polarization orientation. In the specific example illustrated in FIG. 3, s-polarization is indicated by a filled circle (electric field oscillating orthogonal to the plane of incidence) and p-polarization is indicated by a dash perpendicular to both s-polarization and the optical path (electric field oscillating in the plane of incidence).

Multilayer waveplate 317 is illustrated disposed along a boundary of waveguide 310 that is opposite input grating 313. In an embodiment, multilayer waveplate 317 is configured to act as a half-wave plate in reflection for the first spectrum (e.g. blue image light) of image light diffracted by the input grating 313 and configured to act as a full-wave plate in reflection for a second spectrum (e.g. green image light) of the image light 303 that is diffracted by the input grating 313. Hence, when multilayer waveplate 317 receives the first spectrum of image light 303 having a first polarization orientation (e.g. s-polarization) propagating along optical path 371, multilayer waveplate 317 reflects the first spectrum in a second polarization orientation (e.g. p-polarization) that is orthogonal to the first polarization orientation. When multilayer waveplate 317 receive the second spectrum (e.g. green image light) of image light 303 having a first polarization orientation (e.g. s-polarization) propagating along optical path 372, multilayer waveplate 317 reflects the second spectrum in the first polarization orientation. Since input grating 313 is configured to transmit light having the first polarization orientation and the second spectrum of image light retains the first polarization orientation after encountering multilayer waveplate 317, the second spectrum of image light passes through input grating 313 and consequently is outcoupled from waveguide 310, as shown in FIG. 3 (optical path 372). Therefore, the green image light that bled into waveguide 310 is outcoupled prior to reaching output grating 315 and therefore green ghost images may be reduced. Meanwhile, the first spectrum of image light is reflected by input grating 313 and continues propagating along optical path 371 (confined by waveguide 310) until encountering output grating 315, which directs the first spectrum of image light to eyebox area 399 along example optical paths 381A and 381B.

In an embodiment, multilayer waveplate 317 is configured to retard the first spectrum of image light propagating along optical path 371 by a first retardation value that is a half-wave ($\lambda/2$) or an integer plus a half-wave (e.g. $3\lambda/2$ or $5\lambda/2$) and multilayer waveplate 317 is further configured to retard the second spectrum of image light propagating along optical path 372 by a second retardation value that is multiple of a full-wave (e.g. $\lambda$, $2\lambda$, $3\lambda$ . . . ). Therefore, this configuration of multilayer waveplate 317 generates orthogonal polarization orientation in reflection for the first and second spectrums. In this configuration, the multilayer waveplate 317 may be configured to retard undiffracted green image light propagating along optical path 373 by a third retardation value that changes the polarization orientation of the undiffracted green image light. The third retardation value may be $\lambda/2$, $3\lambda/2$, or $5\lambda/2$, for example. The multilayer waveplate 317 may also be configured to retard undiffracted red image light propagating along optical path 374 by the third retardation value that changes the polarization orientation of the undiffracted red image light. The third retardation value may be $\lambda/2$, $3\lambda/2$, or $5\lambda/2$, for example.

Multilayer waveplate 317 may include a birefringent film designed according to the techniques described by G. D. Sharp and J. R. Birge in "Retarder Stack Technology for Color Manipulation," SID, 1999. In these designs, the thin films included in the multilayer waveplates retard light on a color-selective basis to achieve the desired polarization orientation for specific colors of light. The film material and the thickness of the film materials are manipulated to achieve the desired results with respect to color selectivity and polarization orientation. A birefringent film may be fabricated by liquid crystal polymer or stretching polymer, for example. The other multilayer waveplates described in this disclosure may be designed using the techniques described by Sharp and Birge to achieve the configurations disclosed herein.

Figure 4:
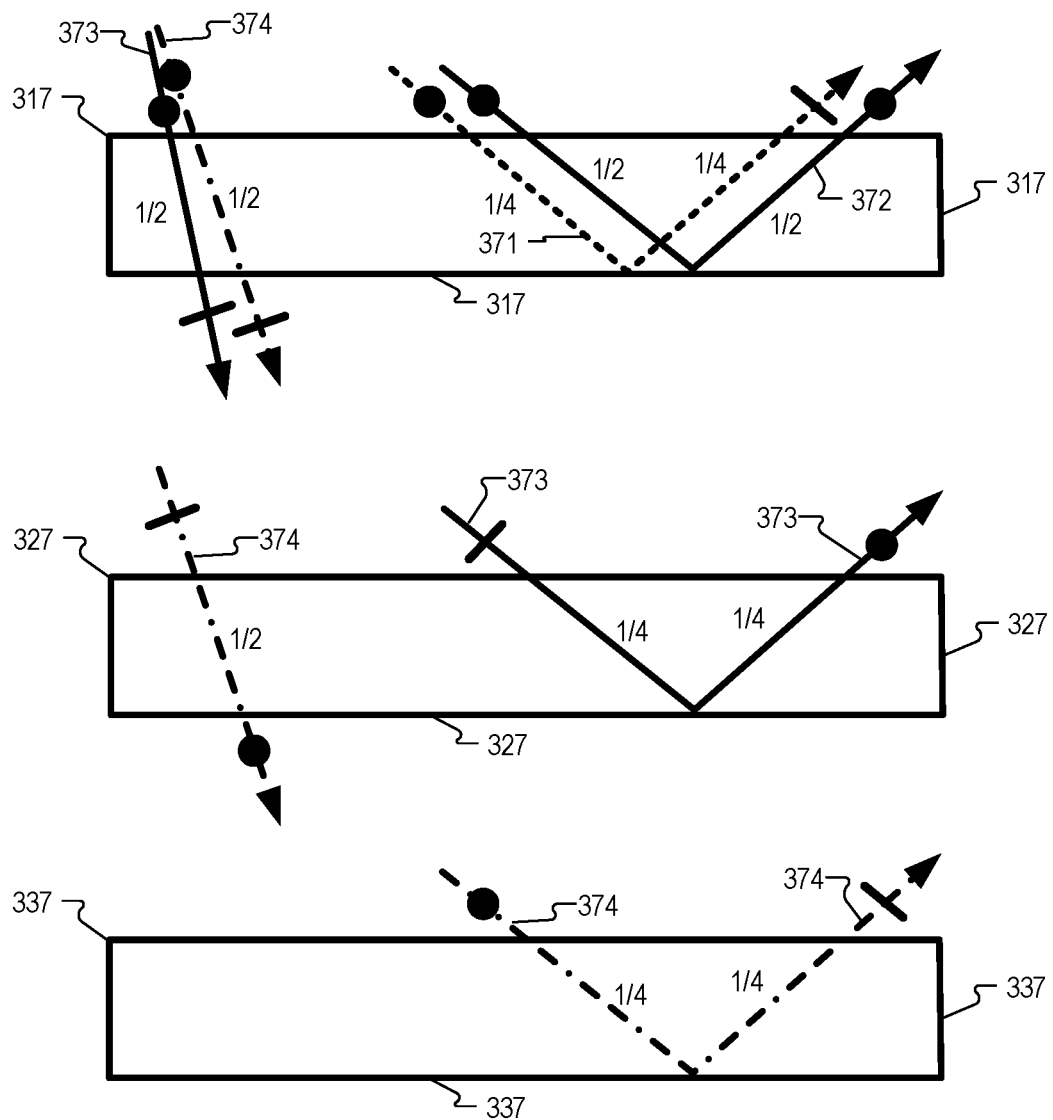
FIG. 4 illustrates example configurations of the multilayer waveplates illustrated in FIG. 3, in accordance with an embodiment of the disclosure.

FIG. 4 illustrates example configurations of the multilayer waveplates illustrated in FIG. 3, in accordance with an embodiment of the disclosure. FIG. 4 illustrates that example multilayer waveplate 317 is configured to act as a half-wave plate in transmission for a third spectrum (e.g. red image light) of image light 303 that is not diffracted by input grating 313 (optical path 374). Example multilayer waveplate 317 is also configured to act as a half-wave plate in transmission for the second spectrum (e.g. green image light) of image light 303 that is not diffracted by input grating 313 (optical path 373). Since multilayer waveplate 317 acts as a half-wave plate for light propagating along optical paths 373 and 374, the polarization orientation for light propagating along optical paths 373 and 374 is converted from the first polarization orientation (e.g. s-polarization) to the second polarization orientation (e.g. p-polarization), as indicated in FIG. 4. Light that is passed (not diffracted) by the input grating 313 may transmit through multilayer waveplate 317 because the angle of incidence does not lend itself to TIR, while light diffracted (e.g. at the first order of diffraction) by input grating 313 is reflected by multilayer waveplate 317 because of the more obtuse angle of incidence, according to the principles of TIR.

FIG. 4 also shows that multilayer waveplate 317 receives the second spectrum of image light 303 propagating along optical path 372 in the first polarization orientation (e.g. s-polarization) and that the second spectrum of image light 303 propagating along optical path 372 exits multilayer waveplate 317 retaining the first polarization orientation since the multilayer waveplate 317 acts a full-wave plate in reflection (half-wave coming in and half-wave in exiting) for the second spectrum propagating along optical path 372. In one embodiment, light propagating along optical path 372 was diffracted by the input grating 313 at a first order of diffraction.

For the first spectrum, multilayer waveplate 317 receives the first spectrum of image light 303 propagating along optical path 371 in the first polarization orientation (e.g. s-polarization) and the first spectrum of image light propagating along optical path 371 exiting multilayer waveplate 317 has been converted to the second polarization orientation (p-polarization in FIG. 4) by virtue of the half-wave plate in reflection characteristics (quarter-wave coming in and quarter-wave in exiting multilayer waveplate 317) of multilayer waveplate 317. In one embodiment, light propagating along optical path 371 was diffracted by the input grating 313 at a first order of diffraction.

Returning to FIG. 3, second waveguide 320 includes an input grating 323 configured to incouple a second spectrum (e.g. green image light) of image light 303 and an output grating 325 is configured to direct the second spectrum propagating in waveguide 320 to the eyebox area 399.

Waveguide 320 may rely on TIR to confine the second spectrum of the image light to the waveguide 320 until output grating 325 directs the second spectrum of the image light to the eyebox area 399. Input grating 323 and output grating 325 may be diffractive gratings that are tuned for a specific wavelength of image light in the second spectrum. In the illustrated embodiment of FIG. 3, input grating 323 is configured to diffract green image light along optical path 373 while transmitting red image light along optical path 374. Input grating 323 may be designed toward diffracting 100% of green image light (e.g. at first order of diffraction) and passing 100% of red image light (e.g. zeroth order of diffraction). The second spectrum of the image light is received by the second input grating 323 from the multilayer waveplate 317, in the illustrated embodiment. In FIG. 3, the second input grating 323 is configured to transmit the second polarization orientation (e.g. p-polarization) and reflect the first polarization orientation (e.g. s-polarization). Second multilayer waveplate 327 is illustrated as being disposed along a boundary of the second waveguide 320 that is opposite second input grating 323. Second multilayer waveplate 327 may be configured to act as a half-wave plate in reflection for the second spectrum of image light propagating along optical path 373 so that second spectrum of image light received having the second polarization orientation received by multilayer waveplate 327 is reflected back to the second input grating 323 in the first polarization orientation. Since the second input grating 323 is configured to reflect the first polarization orientation, the second spectrum of image light is reflected back into waveguide 320 by second input grating 323, as illustrated in FIG. 3. This allows the second spectrum of image light 303 to continue propagating along optical path 373 (confined by waveguide 320) until encountering output grating 325, which directs the second spectrum of image light to eyebox area 399 along example optical paths 383A and 383B.

FIG. 4 shows that multilayer waveplate 327 is also configured to act as a half-wave plate in transmission for the third spectrum (e.g. red image light) of image light 303 passed by the second input grating 323 (optical path 374). FIG. 4 further illustrates the second spectrum of image light 303 being diffracted by second input grating 323 (propagating along optical path 373) changing its polarization orientation when it is reflected by the multilayer waveplate 327.

Returning again to FIG. 3, third waveguide 330 includes an input grating 333 configured to incouple a third spectrum (e.g. red image light) of image light 303 and an output grating 335 is configured to direct the third spectrum propagating in waveguide 330 to the eyebox area 399. Waveguide 330 may rely on TIR to confine the third spectrum of the image light to the waveguide 330 until output grating 335 directs the third spectrum of the image light to the eyebox area 399. Input grating 333 and output grating 335 may be diffractive gratings that are tuned for a specific wavelength of image light in the third spectrum. In the illustrated embodiment of FIG. 3, input grating 333 is configured to incouple the red image light by diffracting the red image light (e.g. at first order of diffraction) along optical path 374. Input grating 333 may be designed toward diffracting 100% of red image light. The third spectrum of the image light 303 is received from the second multilayer waveplate 327 in the illustrated embodiment. Third input grating 333 is configured to transmit the first polarization orientation and reflect the second polarization orientation, in FIG. 3.

The third multilayer waveplate 337 in FIG. 3 is illustrated as being disposed along a boundary of the third waveguide 330 that is opposite third input grating 333. Third multilayer waveplate 337 is configured to act as a half-wave plate in reflection for the third spectrum of image light 303. The third multilayer waveplate 337 reflects the third spectrum (propagating along optical path 374) back to the third input grating 333 in the second polarization orientation, in FIGS. 3 and 4. This allows the third spectrum of image light 303 to continue propagating along optical path 374 (confined by waveguide 330) until encountering output grating 335, which directs the third spectrum of image light to eyebox area 399 along example optical paths 384A and 384B. The first, second, and third spectrums of image light 303 propagating along optical paths 381A, 381B, 383A, 383B, 384A, and 384B may combine to form an image for viewing by a viewer of an HMD such as HMD 100.

Figure 5:
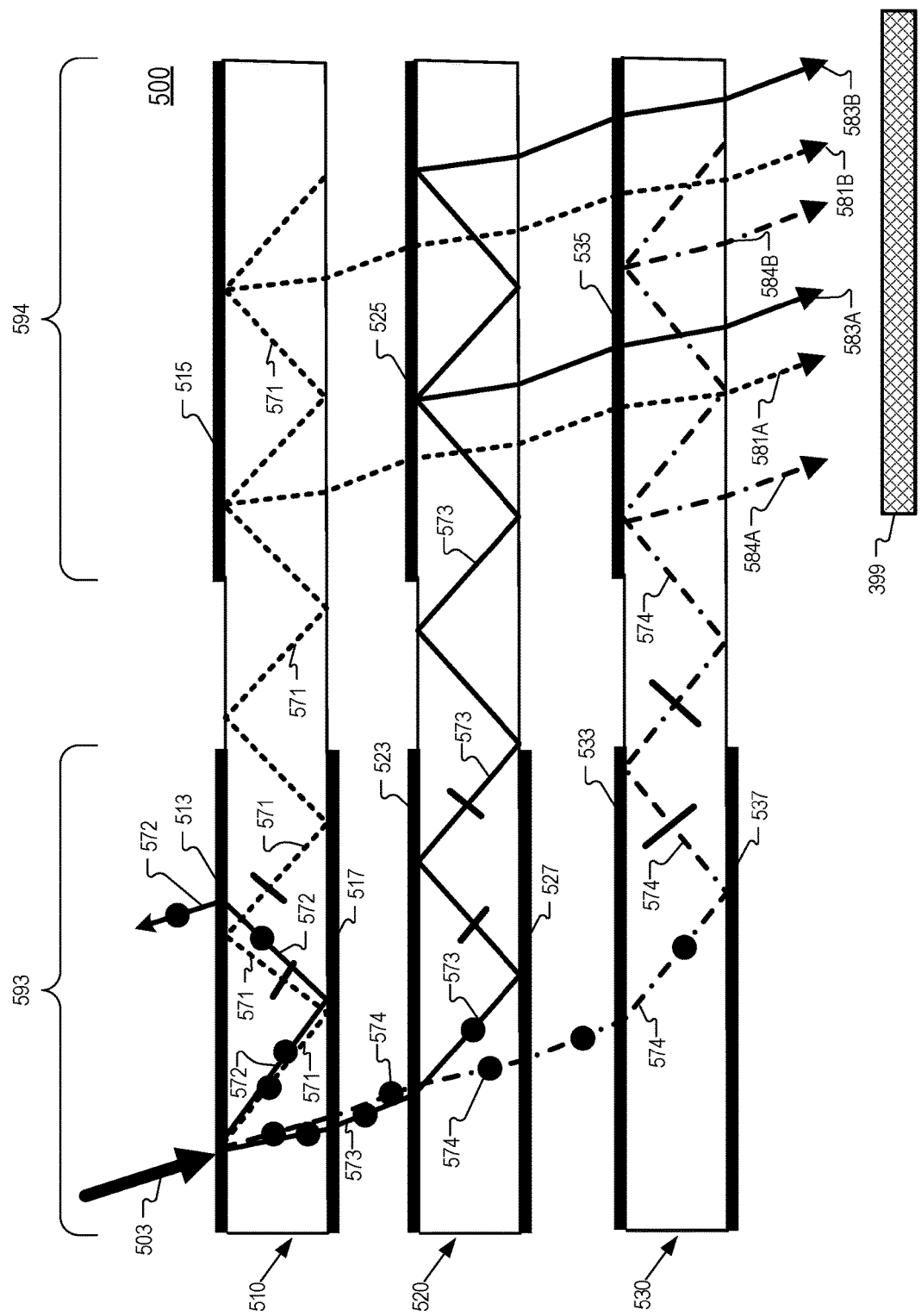
FIG. 5 illustrates example waveguides that include a multilayer waveplate, in accordance with an embodiment of the disclosure.

FIG. 5 illustrates example waveguides that include a multilayer waveplate, in accordance with an embodiment of the disclosure. The stacked waveguide 500 of FIG. 5 is configured differently than the stacked waveguide 300 of FIG. 3 in that at least multilayer waveplate 517 is configured differently than multilayer waveplate 317, input grating 523 is configured differently than input grating 323, and multilayer waveplate 527 is configured differently than multilayer waveplate 327.

Figure 6:
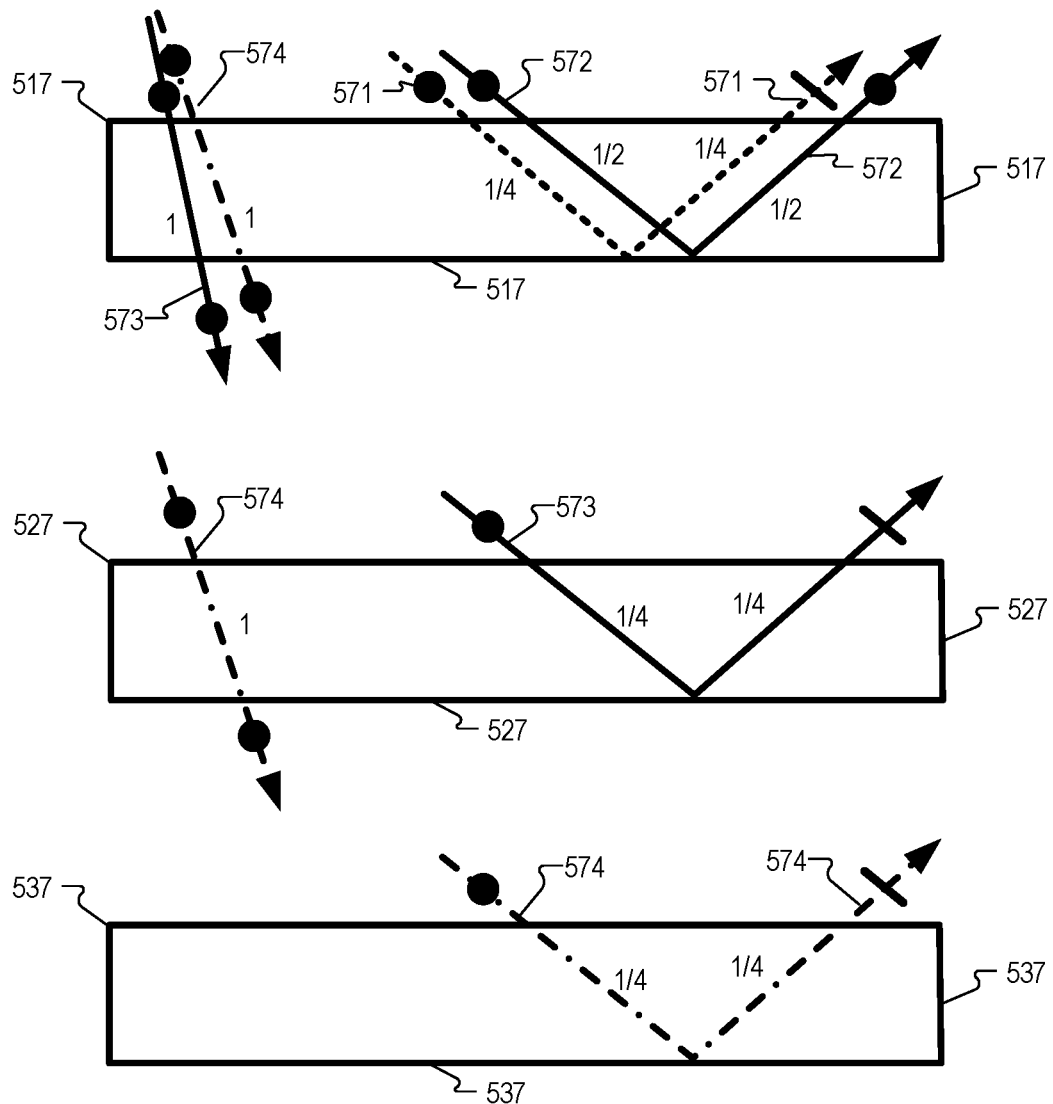
FIG. 6 illustrates example configurations of the multilayer waveplates illustrated in FIG. 5, in accordance with an embodiment of the disclosure.

Multilayer waveplate 517 is configured to act as a full-wave plate in transmission of the third spectrum (e.g. red image light) that is passed by input grating 513, whereas multilayer waveplate 317 is configured to act as a half-wave plate. As illustrated in FIG. 5, the third spectrum of image light 503 propagating along optical path 574 retains its first polarization orientation (e.g. s-polarization) after it is transmitted through multilayer waveplate 517, whereas the third spectrum of image light 303 propagating along optical path 374 changes polarization orientation after propagating through multilayer waveplate 317. FIG. 6 also indicates the full-wave plate configuration of multilayer waveplate 517 with respect to optical path 574.

Multilayer waveplate 517 is also configured to act as a full-wave plate in transmission of the second spectrum (e.g. green image light) that is passed by input grating 513, whereas multilayer waveplate 317 is configured to act as a half-wave plate. As illustrated in FIG. 5, the second spectrum of image light 503 propagating along optical path 573 retains its first polarization orientation (e.g. s-polarization) after it is transmitted through multilayer waveplate 517, whereas the second spectrum of image light 303 propagating along optical path 373 changes polarization orientation after propagating through multilayer waveplate 317. FIG. 6 also indicates the full-wave plate configuration of multilayer waveplate 517 with respect to optical path 573.

Second input grating 523 is configured to transmit the first polarization orientation (e.g. s-polarization) and reflect the second polarization orientation (e.g. p-polarization), whereas second input grating 323 is configured to transmit the second polarization orientation and reflect the first polarization orientation.

Second multilayer waveplate 527 is configured to act as a full-wave plate in transmission of the third spectrum (e.g. red image light) passed by second input grating 523, whereas multilayer waveplate 327 is configured to act as a half-wave plate. As illustrated in FIG. 5, the third spectrum of image light 503 propagating along optical path 574 retains its polarization orientation after it is transmitted through multilayer waveplate 527. FIG. 6 also indicates the full-wave plate configuration of multilayer waveplate 527 with respect to optical path 574.

In addition to multilayer waveplate 517, input grating 523, and multilayer waveplate 527, FIG. 5 also includes components that may be configured similarly to components of stacked waveguide 300 of FIG. 3.

Waveguides 510, 520, and 530, may be included in a stacked waveguide 500, as illustrated. Stacked waveguide 500 includes an input portion 593 and an output portion 594. The waveguides illustrated in FIG. 5 include a multilayer waveplate that also act to reduce optical crosstalk by out-coupling unwanted image light from the waveguides before the unwanted image light is directed to the eyebox area 399 by a given output grating (e.g. 515, 525, or 535).

FIG. 5 includes a first waveguide 510, a second waveguide 520, and a third waveguide 530. First waveguide 510 is configured to incouple a first spectrum of image light 503 into the waveguide 510 and direct the first spectrum into the eyebox area 399. In one embodiment, the first spectrum of image light is blue light. The blue light may be within a range of between 450 and 480 nm, in some embodiments. Second waveguide 520 is configured to incouple a second spectrum of image light 503 into the waveguide 520 and direct the second spectrum into the eyebox area 399. In one embodiment, the second spectrum of image light is green light. The green image light may be within a range of between 500 and 550 nm, in some embodiments. Third waveguide 530 is configured to incouple a third spectrum of image light 503 into the waveguide 530 and direct the third spectrum into the eyebox area 399. In one embodiment, the third spectrum of image light is red light. The red image light may be within a range of between 620 and 650 nm, in some embodiments. Although the waveguides 510, 520, and 530 may be described with respect to red, green, and blue image light, it is understood by those skilled in the art that the disclosed structures and techniques could be applied to other spectrums of image light.

First waveguide 510 includes an input grating 513 configured to incouple a first spectrum (e.g. blue image light) of image light 503 and an output grating 515 is configured to direct the first spectrum propagating in waveguide 510 to the eyebox area 399. Waveguide 510 may rely on Total Internal Reflection (TIR) to confine the first spectrum of the image light to the waveguide 510 until output grating 515 directs the first spectrum of the image light to the eyebox area 399. Input grating 513 and output grating 515 may be diffractive gratings that are tuned for a specific wavelength of image light. In the illustrated embodiment of FIG. 5, input grating 513 is configured to incouple the blue image light by diffracting (e.g. first order diffraction) along optical path 571 while passing green image light (along optical path 573) and passing red image light (along optical path 574). Input grating 513 may be designed toward diffracting 100% of blue image light at a first order of diffraction and passing (zeroth order of diffraction) 100% of both green and red light. Input grating 513 also possesses polarization characteristics in that it is configured to transmit a first polarization orientation (e.g. s-polarization) of image light 503 and reflect a second polarization orientation (e.g. p-polarization) of image light 503 where the first polarization orientation is orthogonal of the second polarization orientation. In the specific example illustrated in FIG. 5, s-polarization is indicated by a filled circle and p-polarization is indicated by a dash perpendicular to both the s-polarization and the optical path.

Multilayer waveplate 517 is illustrated disposed along a boundary of waveguide 510 that is opposite input grating 513. Multilayer waveplate 517 is configured to act as a half-wave plate in reflection for the first spectrum (e.g. blue image light) of image light propagating optical path 571 and configured to act as a full-wave plate in reflection for a second spectrum (e.g. green image light) of the image light 503 propagating along optical path 572. Hence, when multilayer waveplate 517 receives the first spectrum of image light 503 having a first polarization orientation (e.g. s-polarization) propagating along optical path 571, multilayer waveplate 517 reflects the first spectrum in a second polarization orientation (e.g. p-polarization) that is orthogonal to the first polarization orientation. When multilayer waveplate 517 receive the second spectrum (e.g. green image light) of image light 503 having a first polarization orientation (e.g. s-polarization) propagating along optical path 572, multilayer waveplate 517 reflects the second spectrum in the first polarization orientation, as illustrated in FIG. 5. Since input grating 513 is configured to transmit light having the first polarization orientation and the second spectrum of image light retains the first polarization orientation after encountering multilayer waveplate 517, the second spectrum of image light passes through input grating 513 and consequently is outcoupled from waveguide 510, as shown in FIG. 5 (optical path 572). However, the first spectrum of image light is reflected by input grating 513 and continues propagating along optical path 571 (confined by waveguide 510) until encountering output grating 515, which directs the first spectrum of image light to eyebox area 399 along example optical paths 581A and 581B.

In an embodiment, multilayer waveplate 517 is configured to retard the first spectrum of image light propagating along optical path 571 by a first retardation value that is a half-wave ($\lambda/2$) or an integer plus a half-wave (e.g. $3\lambda/2$ or $5\lambda/2$) and multilayer waveplate 517 is further configured to retard the second spectrum of image light propagating along optical path 372 by a second retardation value that is multiple of a full-wave (e.g. $\lambda$, $2\lambda$, $3\lambda$ . . . ). Therefore, this configuration of multilayer waveplate 517 generates orthogonal polarization orientation in reflection for the first and second spectrums. In this configuration, the multilayer waveplate 517 may be configured to retard undiffracted green image light propagating along optical path 573 by a third retardation value that retains the polarization orientation of the undiffracted green image light. The third retardation value may be $\lambda$, $2\lambda$, $3\lambda$, for example. The multilayer waveplate 517 may also be configured to retard undiffracted red image light propagating along optical path 574 by the third retardation value that retains the polarization orientation of the undiffracted red image light. The third retardation value may be $\lambda$, $2\lambda$, $3\lambda$, for example.

In embodiments, multilayer waveplate 517 may have different thicknesses to facilitate different retardation values for different optical paths. In an embodiment, multilayer waveplate 517 has a first thickness where the multilayer waveplate 517 receives the incoupled green image light diffracted by the input grating 513 and multilayer waveplate 517 has a second thickness where the multilayer waveplate receives the undiffracted green image light (optical path 573). The second thickness may be greater than the first thickness to provide a sufficiently large retardation value (e.g. $\lambda$, $2\lambda$, $3\lambda$) to the undiffracted green image light transmitted through the multilayer waveplate 517.

FIG. 6 illustrates example configurations of the multilayer waveplates illustrated in FIG. 5, in accordance with an embodiment of the disclosure. FIG. 6 illustrates that example multilayer waveplate 517 is configured to act as a full-wave plate in transmission for a third spectrum (e.g. red image light) of image light 503 passed by the input grating 513 without diffraction (optical path 574). Example multilayer waveplate 517 is also configured to act as a full-wave plate in transmission for the second spectrum (e.g. green image light) of image light 503 passed by the input grating 513 without diffraction (optical path 573). Since multilayer waveplate 517 acts as a full-wave plate for light propagating along optical paths 573 and 574, the polarization orientation for light propagating along optical paths 573 and 574 is retained after passing through multilayer waveplate 517, as indicated in FIG. 6.

FIG. 6 also shows that multilayer waveplate 517 receives the second spectrum of image light 503 propagating along optical path 572 in the first polarization orientation (e.g. s-polarization) and that the second spectrum of image light 503 propagating along optical path 572 exits multilayer waveplate 517 retaining the first polarization orientation since the multilayer waveplate 517 acts a full-wave plate in reflection (half-wave coming in and half-wave in exiting) for the second spectrum propagating along optical path 572. In one embodiment, light propagating along optical path 572 was diffracted by the input grating 513 at a first order of diffraction.

For the first spectrum, multilayer waveplate 517 receives the first spectrum of image light 503 propagating along optical path 571 in the first polarization orientation (e.g. s-polarization) and the first spectrum of image light propagating along optical path 571 exiting multilayer waveplate 517 has been converted to the second polarization orientation (p-polarization in FIG. 6) by virtue of the half-wave plate in reflection (quarter-wave coming in and quarter-wave in exiting multilayer waveplate 517) characteristic of multilayer waveplate 517. In one embodiment, light propagating along optical path 571 was diffracted by the input grating 513 at a first order of diffraction.

Returning to FIG. 5, second waveguide 520 includes an input grating 523 configured to incouple a second spectrum (e.g. green image light) of image light 503 and an output grating 525 is configured to direct the second spectrum propagating in waveguide 520 to the eyebox area 399. Waveguide 520 may rely on TIR to confine the second spectrum of the image light to the waveguide 520 until output grating 525 directs the second spectrum of the image light to the eyebox area 399. Input grating 523 and output grating 525 may be diffractive gratings that are tuned for a specific wavelength of image light in the second spectrum. In the illustrated embodiment of FIG. 5, input grating 523 is configured to diffract green image (e.g. first order of diffraction) along optical path 573 while passing the red image light without diffraction (along optical path 574). Input grating 523 may be designed toward diffracting 100% of green image light (e.g. at a first order of diffraction) and passing 100% of red image light without diffraction. The second spectrum of the image light is received by the second input grating 523 through the multilayer waveplate 517, in the illustrated embodiment. In FIG. 5, the second input grating 523 is configured to transmit the first polarization orientation (e.g. s-polarization) and reflect the second polarization orientation (e.g. p-polarization). Second multilayer waveplate 527 is illustrated as being disposed along a boundary of the second waveguide 520 that is opposite second input grating 523. Second multilayer waveplate 527 may be configured to act as a half-wave plate in reflection for the second spectrum of image light propagating along optical path 573 so that second spectrum image light received having the first polarization orientation received by multilayer waveplate 527 is reflected back to the second input grating 523 in the second polarization orientation. Since the second input grating 523 is configured to reflect the second polarization orientation, the second spectrum of image light is reflected back into waveguide 520 by second input grating 523, as illustrated in FIG. 5. This allows the second spectrum of image light 503 to continue propagating along optical path 573 (confined by waveguide 520) until encountering output grating 525, which directs the second spectrum of image light to eyebox area 399 along example optical paths 583A and 583B.

FIG. 6 shows that multilayer waveplate 527 is also configured to act as a full-wave plate in transmission for the third spectrum (e.g. red image light) of image light 503 passed by second input grating 523 without diffraction (optical path 574). FIG. 6 further illustrates the second spectrum of image light 503 being diffracted by second input grating 523 (propagating along optical path 573) changing its polarization orientation when it is reflected by the multilayer waveplate 527.

Returning again to FIG. 5, third waveguide 530 includes an input grating 533 configured to incouple a third spectrum (e.g. red image light) of image light 503 and an output grating 535 is configured to direct the third spectrum propagating in waveguide 530 to the eyebox area 399. Waveguide 530 may rely on TIR to confine the third spectrum of the image light to the waveguide 530 until output grating 535 directs the third spectrum of the image light to the eyebox area 399. Input grating 533 and output grating 535 may be diffractive gratings that are tuned for a specific wavelength of image light in the third spectrum. In the illustrated embodiment of FIG. 5, input grating 533 is configured to incouple the red image light into waveguide 530 by diffracting the red image light along optical path 574. Input grating 533 may be designed toward diffracting 100% of red image light at a first order of diffraction. The third spectrum of the image light 503 is received through the second multilayer waveplate 527 in the illustrated embodiment. Third input grating 533 is configured to transmit the first polarization orientation and reflect the second polarization orientation, in FIG. 5.

The third multilayer waveplate 537 in FIG. 5 is illustrated as being disposed along a boundary of the third waveguide 530 that is opposite third input grating 533. Third multilayer waveplate 537 is configured to act as a half-wave plate in reflection for the third spectrum of image light 503. The third multilayer waveplate 537 reflects the third spectrum (propagating along optical path 574) back to the third input grating 533 in the second polarization orientation, in FIGS. 5 and 6. This allows the third spectrum of image light 503 to continue propagating along optical path 574 (confined by waveguide 530) until encountering output grating 535, which directs the third spectrum of image light to eyebox area 399 along example optical paths 584A and 584B. The first, second, and third spectrums of image light 503 propagating along optical paths 581A, 581B, 583A, 583B, 584A, and 584B may combine to form an image for viewing by a viewer of an HMD such as HMD 100, for example.

In an embodiment of stacked waveguide 500, multilayer waveplate 517 is included in stacked waveguide 500 while multilayer waveplates 527 and/or 537 are/is not included and instead TIR is relied upon to confine the incoupled image light to the waveguides 520 and/or 530, respectively. Green image light bleeding into waveguide 510 may be the largest cause of ghost images while unwanted spectrums of image light bleeding into waveguides 520 and 530 may be of lesser concern. For the same reasons, stacked waveguide 300 may include multilayer waveplate 317 but not multilayer waveplate 327 and/or 337.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I$^2$C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical structure comprising:
   an input grating configured to incouple a first spectrum of received image light, wherein the input grating is configured to transmit a first polarization orientation of the image light and reflect a second polarization orientation of the image light; and
   a multilayer waveplate configured to reflect the first spectrum of the image light incoupled by the input grating in the second polarization orientation and reflect a second spectrum of the image light incoupled by the input grating by diffraction in the first polarization orientation, wherein the multilayer waveplate is configured to act as a half-wave plate in reflection for the first spectrum of the image light diffracted by the input grating and configured to act as a full-wave plate in reflection for the second spectrum of the image light diffracted by the input grating.

2. The optical structure of claim 1, wherein the multilayer waveplate is configured to act as a half-wave plate in transmission for a third spectrum of the image light that is undiffracted by the input grating, and wherein the multilayer waveplate is configured to act as a half-wave plate in transmission for the second spectrum of the image light that is undiffracted by the input grating.

3. The optical structure of claim 2 further comprising:
   a second input grating configured to incouple the second spectrum of the image light, the second spectrum of the image light received through the multilayer waveplate, wherein the second input grating is configured to transmit the second polarization orientation and reflect the first polarization orientation; and
   a second multilayer waveplate configured to act as a half-wave plate in reflection for the second spectrum of the image light diffracted by the second input grating, the second multilayer waveplate reflecting the second spectrum of the image light back to the second input grating in the first polarization orientation.

4. The optical structure of claim 3 further comprising:
   a third input grating configured to incouple the third spectrum of the image light, the third spectrum of the image light received from the second multilayer waveplate, wherein the third input grating is configured to transmit the first polarization orientation and reflect the second polarization orientation; and
   a third multilayer waveplate configured to act as a half-wave plate in reflection for the third spectrum of the image light diffracted by the third input grating, the third multilayer waveplate reflecting the third spectrum of image light back to the third input grating in the second polarization orientation.

5. The optical structure of claim 1, wherein the multilayer waveplate is configured to act as a full-wave plate in transmission for a third spectrum of the image light that is undiffracted by the input grating, and wherein the multilayer waveplate is configured to act as a full-wave plate in transmission for the second spectrum of the image light that is undiffracted by the input grating.

6. The optical structure of claim 5 further comprising:
   a second input grating configured to incouple the second spectrum of the image light, the second spectrum of the image light received through the multilayer waveplate, wherein the second input grating is configured to transmit the first polarization orientation and reflect the second polarization orientation; and a second multilayer waveplate configured to act as a half-wave plate in reflection for the second spectrum of the image light diffracted by the second input grating, the second multilayer waveplate reflecting the second spectrum of image light back to the second input grating in the second polarization orientation.

7. The optical structure of claim 6 further comprising:
a third input grating configured to incouple the third spectrum of the image light, the third spectrum of the image light received through the second multilayer waveplate, wherein the third input grating is configured to transmit the first polarization orientation and reflect the second polarization orientation; and
a third multilayer waveplate configured to act as a half-wave plate in reflection for the third spectrum of the image light diffracted by the third input grating, the third multilayer waveplate reflecting the third spectrum of image light back to the third input grating in the second polarization orientation.

8. The optical structure of claim 1, wherein the first spectrum includes blue light, and wherein the second spectrum includes green light.

9. The optical structure of claim 1 further comprising:
an output grating, wherein the output grating is configured to receive the first spectrum of the image light and direct the first spectrum of the image light as a portion of an image.

10. A Head Mounted Display (HMD) comprising:
a display for providing image light; and
an optical structure to receive the image light and direct the image light in an eyebox direction, the optical structure comprising:
an input grating configured to incouple a first spectrum of received image light, wherein the input grating is configured to transmit a first polarization orientation of the image light and reflect a second polarization orientation of the image light; and
a multilayer waveplate configured to reflect the first spectrum of the image light incoupled by the input grating in the second polarization orientation and reflect a second spectrum of the image light incoupled by the input grating by diffraction in the first polarization orientation, wherein the multilayer waveplate is configured to act as a half-wave plate in reflection for the first spectrum of the image light diffracted by the input grating and configured to act as a full-wave plate in reflection for the second spectrum of the image light diffracted by the input grating.

11. The HMD of claim 10, wherein the multilayer waveplate is configured to act as a half-wave plate in transmission for a third spectrum of the image light that is undiffracted by the input grating, and wherein the multilayer waveplate is configured to act as a half-wave plate in transmission for the second spectrum of the image light that is undiffracted by the input grating.

12. The HMD of claim 10, wherein the multilayer waveplate includes a birefringent film.

13. An optical structure comprising:
an input grating configured to incouple a first spectrum of received image light, wherein the input grating is configured to transmit a first polarization orientation of the image light and reflect a second polarization orientation of the image light; and
a multilayer waveplate configured to reflect the first spectrum of the image light incoupled by the input grating in the second polarization orientation and reflect a second spectrum of the image light incoupled by the input grating by diffraction in the first polarization orientation, wherein the first spectrum includes blue light, and wherein the second spectrum includes green light.

* * * * *